Patented Feb. 4, 1941

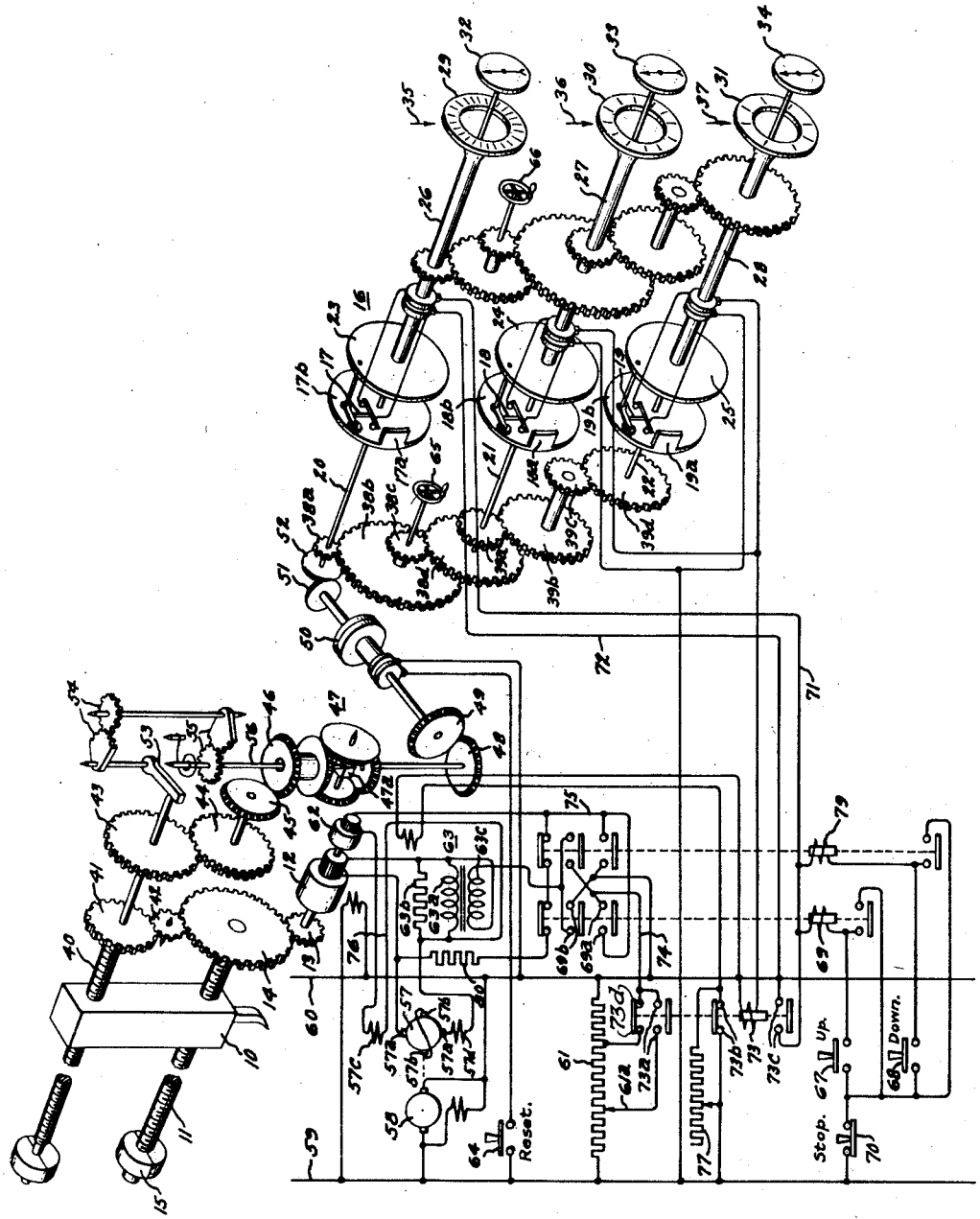
Inventors:
Martin A. Edwards,
Kenneth K. Bowman,
by Harry E. Dunham
Their Attorney.

2,230,864

UNITED STATES PATENT OFFICE 2,230,864

CONTROL SYSTEM

Martin A. Edwards and Kenneth K. Bowman, Scotia, N. Y., assignors to General Electric Company, a corporation of New York Application March 1, 1940, Serial No. 321,740

10 Claims. (Cl. 77—32)

This invention relates to control systems, more particularly to systems for controlling the movement of elements or objects to predetermined limits, and it has for an object the provision of a simple, reliable, and improved system of this character.

One aspect of the invention relates to control systems for machine tools and the like in which an element such as a tool carrying member is driven by means of a power screw, and a more specific object of the invention is the provision of means for correcting errors introduced by imperfections or stretch of the power screw.

Another object of the invention is the provision of means for maintaining the speed of the power screw and the member driven thereby substantially constant irrespective of changes in the load thereon.

In carrying the invention into effect in one form thereof, a movable member, such for example, as the tool holder of a machine tool, is driven by driving means which include a power screw. Suitable limit switch mechanism is provided for accurately presetting the stopping point or limit of travel of the movable member. Driving connections are provided between the power screw and limit switch mechanism for actuating the limit switch mechanism to stop the driving means when the movable member reaches the limit of travel which was preset on the limit switch mechanism. In addition, means are provided for measuring the error of the power screw and modifying the setting of the limit switch mechanism to compensate for such error.

In illustrating the invention in one form thereof, it is shown as embodied in a control system for the tool holder of a boring mill such as is used for boring the shells of large steam turbines.

For a better and more complete understanding of the invention, reference should now be had to the following specification and to the accompanying drawing, the single figure of which is a schematic diagram of an embodiment of the invention.

Referring now to the drawing, the tool holder 10 is driven by suitable driving means which include a power screw 11 and an electric motor 12, the shaft of which is connected through suitable gearing 13 and 14 to the power screw. The power screw is journaled in suitable bearings for motion of rotation only. The bearing 15 for the left-hand end of the power screw is shown in the drawing.

Suitable limit switch mechanism 16 is provided for presetting the limit of travel of the tool holder 10, thereby to preset the depth of cut of the tool carried thereby. This limit switch mechanism comprises three adjustable cam actuated switches 17, 18, and 19. The switches 18 and 19 control the slow-down of motor 12 as the tool holder approaches its predetermined limit of travel, and the switch 17 effects the stopping of the motor when the tool holder reaches this limit.

A cam 17a for actuating switch 17 is mounted on a disk 17b which is mounted on a shaft 20 for rotation therewith. Similar cams 18a and 19a are carried by disks 18b and 19b, respectively, which are mounted on shafts 21 and 22, respectively. The switches 17, 18, and 19 are mounted on disks 23, 24, and 25, respectively, for rotation therewith, and disks 23, 24, and 25 are respectively mounted on hollow shafts 26, 27, and 28 for rotation therewith. On the right-hand ends of shafts 26, 27, and 28 graduated ring dials 29, 30, and 31, respectively, are fixedly mounted. Ring dial 31 is calibrated in feet, dial 30 in inches, and dial 29 in mils. The shafts 20, 21, and 22 which carry the switch actuating cams 17a, 18a, and 19a extend through the hollow shafts 26, 27, and 28, respectively, and at their ends are mounted index dials 32, 33, and 34 which cooperate with graduated ring dials 29, 30, and 31, respectively. Zero indexes 35, 36, and 37 are suitably marked on the housings for the dials and are used for setting the graduated ring dials at zero before the boring operation is started.

Shafts 20 and 21 are connected together by a 48 to 1 gear reduction comprising gears 38a, 38b, 38c, and 38d, and shafts 21 and 22 are connected together by a 12 to 1 gear reduction comprising gears 39a, 39b, 39c, and 39d. Similarly the ring dial shafts 26, 27, and 28 are connected together by gearing having the same reductions as those between shafts 20, 21, and 22, respectively.

Because of the heavy cutting load imposed on the power screw 11, its threads become worn and the screw becomes inaccurate. When a heavy load is imposed on the screw, it is caused to stretch. These errors may exceed the tolerances which are allowed for certain classes of work.

For the purpose of compensating for this error, means are provided for measuring this error and additional means are provided for modifying the setting of the presettable limit switch mechanism. The error measuring means comprises a precision screw 40 which is in threaded engagement with the tool carrying member 10. This precision screw carries no part of the cutting load. Its thread is made very accurately, and since it carries no part of the cutting load, the thread remains accurate and the screw does not stretch as does the power screw when under load. The precision screw is connected to the power screw by gears 41, 42, and gear 14 which is driven by motor 12. The gear ratio between the two screws is such that the lead times the speed of both screws are equal. Consequently, if the power screw is absolutely accurate, the two screws will rotate in exact synchronism with each other, and there will be no tendency to endwise or axial movement of the precision screw. However, if the power screw is stretched under load or if any other error exists in its thread, there will be a corresponding error in the position of the member 10 on the power screw and the member 10, which is in threaded engagement with the accurately threaded precision screw, will cause the precision screw to move axially an amount equal to such error.

The precision screw 40 is connected to the limit switch mechanism 16 through driving connections which comprise gears 43, 44, 45, and 46, mechanical differential device 47, gears 48 and 49, electromagnetically actuated clutch 50, and bevel gears 51 and 52.

The endwise or axial movement of precision screw 40 is introduced into these driving connections by means of a crank 53, actuated by axial movement of the screw, gearings 54 and 55, and shaft 56 which is connected to the cage member 47a of the differential device 47.

The motor 12 is supplied from a suitable source of variable voltage such as represented by the armature flux excited generator 57 which is driven at a speed, which is preferably substantially constant, by any suitable driving means such as the direct-current shunt motor 58 which, in turn, is supplied from a suitable source represented by the two supply lines 59 and 60. Generator 57 has two sets of brushes per pair of poles. Since generator 57, as illustrated, has but two sets of brushes, the generator is therefore a two-pole machine. One set of brushes 57a is connected to an external load which, in this case, comprises the armature of motor 12, and the other set of brushes 57b is short-circuited. The two mutually perpendicular brush axes of these two sets of brushes are known as the control axis and the short-circuit axis, respectively. The net flux along the control axis is produced by a control field winding 57c, a series compensating field winding 57d, and the armature reaction of the load current. The flux along the short-circuit axis is produced by the armature reaction of the short-circuit current. This short-circuit axis flux, cut by the armature conductors, generates the voltage which appears across the load brushes and is supplied to motor 12, and the control axis flux produces the voltage which appears across the short-circuited brushes and causes short-circuit current to flow.

The operation of generator 57 may be briefly described as follows: Voltage is applied to the control field winding 57c and current begins to build up in it. Immediately there is generated a voltage in the short-circuit path which circulates a large current in the short circuit. The armature reaction produced by this current generates a voltage across the load brushes 57a and causes load current to flow. The armature reaction mmf. of the load current is balanced by the ampere turns of the compensating field 57d. Hence, the only control field required is just enough to cause rated current to flow in the short-circuit. In this way the power amplification is increased many times. The predominant characteristics of generator 57 are rapid response and low ratio of control watts to load watts, e. g. an amplification which may be as great as 25000:1.

A potentiometer 61 which is connected across the constant voltage source 59, 60 provides an adjustable source of control voltage with which the speed of motor 12 is to be compared and to which it is made to correspond. For this purpose a tachometer generator 62 is driven by motor 12 and generates a voltage proportional to the speed of motor 12. The tachometer generator and the potentiometer 61 are connected in circuit so that their voltages oppose each other and the difference of the two voltages is applied to the control field winding 57c. From this it will be seen that the speed of motor 12 is closely regulated at any desired speed which may be set on the potentiometer. Because of the high speed of response of generator 57, hunting is not troublesome.

However, this circuit is primarily a regulating circuit and as in all regulating circuits, some hunting is present. If it is desired to reduce this hunting to an insignificant value, a suitable anti-hunting device such as the anti-hunting transformer 63 is employed. The primary winding 63a of this transformer is connected across a resistor 63b in the armature circuit of motor 12 and its secondary winding 63c is connected in circuit with the potentiometer 61, tachometer generator 62 and control field winding 57c of generator 57. When the armature current is constant, no voltage is induced in the secondary winding of the transformer, and thus no correction for hunting is introduced in the field circuit of generator 57. However, when the armature current changes as is the case when hunting occurs, a voltage is induced in the secondary winding proportional to the rate of change of armature current and this voltage is supplied to the field circuit of generator 57 so as to oppose the change and thus to reduce the hunting to a negligible value. By increasing the ampere turns of compensating field 57d the generator 57 may be compounded, if desired, to compensate for the IR drop in the loop circuit of the armatures of generator 57 and motor 12.

With the foregoing understanding of the elements and their organization, the operation of the system will readily be understood from the following detailed description.

Potentiometer 61 is adjusted by moving its movable contact member 61a until its position corresponds to the desired speed of motor 12. The operator then makes an index cut which he measures with gauges in the conventional manner. This index cut is the "zero" with respect to which all other cuts will be made. The operator then presses the "reset" push button switch 64 to energize and open the clutch 50 thereby to disconnect index pointer dials 32, 33, and 34 from the precision screw 40. These index pointer dials may then be turned to zero, i. e. to line up with the stationary index arrows by turning handwheel 65. The "reset" button is then released and clutch 50 is again engaged.

Next the operator sets the ring dials 31, 30, and 29 for the desired depth of cut in feet, inches, and mils. This is accomplished by turning the handwheel 66 until the graduations on ring dials 31, 30, 29 representing the desired number of feet, inches, and mils register with the stationary index pointers 35, 36 and 37, respectively.

Depending upon the direction which the tool is to move, one or the other of directional push button switches 67 or 68 is pressed. Assume that the cut is to be made in the up direction, the button 67 is depressed to complete an energizing circuit for the operating coil of "up" directional contactor 69. This circuit extends from side 59 of the source through manually closed contacts of "stop" button 70, contacts of button 67, coil of contactor 69, conductor 71, contacts of switch 17, and conductor 72 to the side 60 of the source. Contactor 73 was previously closed. Its circuit is traced from the side 60 of the source through the coil of contactor 73, contacts of switches 18 and 19 in parallel to the side 59 of the source.

In the closed position of both contactors 69 and 73, the voltage of potentiometer 61 is applied to the field circuit of generator 57. The circuit is traced from contacts 61a of the potentiometer through intermediate contacts 73a of contactor 73 in the closed position thereof, conductor 74, contacts 69a, conductor 75, armature of tachometer generator 62, field winding 57c, conductor 76, primary and secondary windings 63a and 63c, contacts 69b to the side 60 of the source. At the same time, contacts 73b of contactor 73 are open and insert potentiometer 77 in the field of the tachometer generator 62. The potentiometer 77 has previously been adjusted so that at the desired speed of the motor 12, the tachometer generator will generate a voltage substantially equal to the voltage of potentiometer 61.

The field current in the control field winding 57c of the generator will produce a voltage across load brushes 57a, as explained in the foregoing. This voltage will cause the motor 12 to accelerate until the difference between the voltage of the tachometer generator and the voltage of potentiometer 61 to the right of contact 61a will supply just enough field to generator 57 to produce steady-state conditions. When this steady-state condition is reached, the motor 12 will be rotating at the desired speed.

The precision screw 40 drives the index dials 32, 33, and 34 through the connections previously described. If there is any error in the power screw, the precision screw 40 will move axially in its bearings and introduce a corresponding correcting movement through gearing connections 54, 55, and 56 into differential 47 and thereby change the position of cam 17a and "thousandths" index dial 32 sufficiently to compensate for the error. The "inches" and "feet" cams 18a and 19a or index dials 33 and 34 are also changed in position by means of gears 38c to 39d. Thus the index dials always show the correct tool movement within the accuracy of the precision screw and gearing.

As the tool nears the desired stopping point, "foot" cam 19a opens the contacts of switch 19 and thereby interrupts the short circuit around the contacts of "inch" switch 18. As the "inch" index dial 33 approaches zero on the "inch" ring dial 30, the contacts of switch 18 open and interrupt the holding circuit of contactor 73 which is accordingly deenergized and opened.

In opening, the lower contacts 73c of contactor 73 interrupt the holding circuit in parallel with the contacts of switch 17 for the up directional contactor 69. Contacts 73b, in closing, short-circuit the potentiometer 77 thereby strengthening the field of tachometer generator 62. This tends to increase the voltage of the tachometer generator which in turn causes the generator 57 to decrease the voltage supplied to the motor 12 thereby effecting slow-down. Contacts 73a in opening and contacts 73d in closing reduce the amount of potentiometer 61 being used and this produces a still further slow-down of motor 12. After this slow-down the motor 12 will be operating at a very slow speed such, for example, as 30 R. P. M.

Finally, as the "thousandths" dial 32 reaches zero on the "thousandths" ring dial 29, cam 17a opens the contacts of switch 17. This interrupts the energizing circuit of the operating coil of up directional contactor 69, which opens in response to deenergization and interrupts the field circuit of generator 57 and connects the field winding 57c across the terminals of motor 12 and the tachometer generator 62 to establish a circuit known as a "suicide" circuit, because the action of the field is such as to reduce or kill the generator voltage. This circuit is traced from the upper terminal of field winding 57c through the armature of tachometer generator 62, upper auxiliary contacts of directional contactors 79 and 69, resistor 80, armature of motor 12, and conductor 76 to the lower terminal of the field winding.

As a result the voltage supplied to motor 12 is rapidly reduced to zero and the tool is brought to rest accurately at the desired stopping point.

The operation for the reverse or "down" direction is similar.

Although in accordance with the provisions of the patent statutes, the invention is described as embodied in concrete form and the principle of the invention has been explained together with the best mode in which it is now contemplated applying that principle, it will be understood that the elements and connections shown are merely illustrative and that the invention is not limited thereto, since alterations and modifications will readily suggest themselves to persons skilled in the art without departing from the true spirit of the invention or from the scope of the annexed claims.

What we claim as new and desire to secure by Letters Patent of the United States is:

1. A control system for machine tools and the like comprising a movable member, driving means for said member including a power screw, presettable limit switch mechanism for controlling the operation of said driving means, driving connections between said driving means and said limit switch mechanism for actuating said limit switch mechanism to stop said driving means when said member arrives at a limit of travel corresponding to the setting of said switch mechanism, means for measuring the error of said power screw, and means responsive to said error measuring device for changing the setting of said limit switch mechanism to compensate for said error.

2. A control system for machine tools and the like comprising a movable member, driving means for said member including a power screw, presettable limit switch mechanism for controlling the operation of said driving means, driving connections between said driving means and said limit switch mechanism for actuating said limit switch mechanism to stop said driving means when said member arrives at a limit of travel corresponding to the setting of said switch mechanism, means for measuring the error of said power screw comprising a precision screw driven by said driving means, and means for introducing a correcting movement into said driving connections proportional to said error to compensate said limit switch mechanism for said error.

3. A control system for machine tools and the like comprising a movable member, driving means for said member including a power screw, presettable limit switch mechanism for controlling the operation of said driving means, driving connections betwen said driving means and said limit switch mechanism for actuating said limit switch mechanism to stop said driving means when said member arrives at a limit of travel corresponding to the setting of said switch mechanism, a differential device included in said driving connections, means for measuring the error of said power screw, and means responsive to said error measuring device for introducing a correcting movement into said driving connections through said differential device thereby to compensate said limit switch mechanism for said error.

4. A control system for machine tools and the like comprising a movable member, driving means for said member including a power screw, presettable limit switch mechanism for controlling the operation of said driving means, driving connections between said driving means and said limit switch mechanism for actuating said limit switch mechanism to stop said driving means when said member arrives at a limit of travel corresponding to the setting of said switch mechanism, means for measuring the error of said power screw comprising a precision screw driven by said driving means and threaded to said member, said precision screw being mounted for axial movement in its bearings whereby said precision screw moves axially an amount proportional to said error, and means responsive to said axial movement for introducing a correcting movement into said driving connections through said differential device to compensate said limit switch mechanism for said error.

5. A control system for machine tools and the like comprising a movable member, driving means for said member comprising a power screw in threaded engagement with said member and an electric motor connected to rotate said screw, presettable limit switch mechanism for controlling the operation of said motor, driving connections including a mechanical differential device between said driving means and said limit switch mechanism for actuating said limit switch mechanism to stop said motor when said movable member arrives at a limit of travel corresponding to the setting of said limit switch mechanism, means for detecting the error of said power screw comprising a precision screw mounted in its bearings for axial movement and driven by said driving means, said precision screw being in threaded engagement with said movable member whereby an axial movement proportional to said error is produced, and means responsive to said axial movement of said movable member and connected to said differential device for introducing a correcting motion in said driving connections to compensate said limit switch mechanism for said error.

6. A control system for machine tools and the like comprising a movable tool carrying member, driving means for said member including a power screw in threaded engagement with said member and an electric motor connected to rotate said screw, means for maintaining the speed of said motor substantially constant at a selected speed, presettable limit switch mechanism for controlling the operation of said driving means, driving connections between said driving means and said limit switch mechanism for actuating said limit switch mechanism to stop said motor when said tool carrying member arrives at a predetermined limit of travel corresponding to the setting of said switch mechanism, means for measuring the error of said power screw, and means responsive to said error measuring means for compensating said limit switch mechanism for said error.

7. A control system for machine tools and the like comprising a movable tool carrying member, driving means for said member comprising a power screw in threaded engagement with said member and an electric motor connected to rotate said screw, a source of adjustable control voltage, means for producing a second control voltage proportional to the speed of said motor, and means responsive to both of said voltages for controlling said motor to maintain its speed substantially constant, presettable limit switch mechanism for controlling the operation of said driving means, driving connections between said driving means and said limit switch mechanism for actuating said limit switch mechanism to stop said motor when said tool carrying member arrives at a predetermined limit of travel corresponding to the setting of said switch mechanism, means for measuring the error of said power screw, and means responsive to said error measuring means for compensating said limit switch mechanism for said error.

8. A control system for machine tools and the like comprising a movable tool carrying member, driving means for said member comprising a power screw in threaded engagement with said member and an electric motor connected to rotate said screw, a source of adjustable control voltage, a tachometer generator driven by said motor for generating a second control voltage proportional to the speed of said motor, means controlled by both said control voltages for controlling said motor to maintain its speed substantially constant at a selected value corresponding to the setting of said source of adjustable control voltage, presettable limit switch mechanism for controlling the operation of said driving means, driving connections between said driving means and said limit switch mechanism for actuating said limit switch mechanism to stop said motor when said tool carrying member arrives at a predetermined limit of travel corresponding to the setting of said switch mechanism, means for measuring the error of said power screw, and means responsive to said error measuring means for compensating said limit switch mechanism for said error.

9. A control system for machine tools and the like having a movable tool carrying member, driving means for said member including a power screw in threaded engagement with said member and an electric motor connected to rotate said screw, a generator for supplying a voltage to said motor, said generator being provided with a control field winding, a source of adjustable control voltage, a tachometer generator driven by said motor for generating a second control voltage proportional to the speed of said motor, said source and said tachometer generator being connected in circuit with said control field winding for controlling said supply generator to maintain the speed of said motor constant at a value corresponding to the setting of said adjustable voltage source, presettable limit switch mechanism for controlling the operation of said driving means, driving connections between said driving means and said limit switch mechanism for actuating said limit switch mechanism to stop said motor when said tool carrying member arrives at a predetermined limit of travel corresponding to the setting of said switch mechanism, means for measuring the error of said power screw, and means responsive to said error measuring means for compensating said limit switch mechanism for said error.

10. A control system for machine tools and the like having a movable member comprising in combination, driving means for said member comprising a power screw in threaded engagement with said member and an electric motor for rotating said screw, a source of adjustable control voltage, a tachometer generator driven by said motor for generating a second control voltage proportional to the speed of said motor and means controlled by said voltages for maintaining the speed of said motor substantially constant at a value corresponding to the adjustment of said source, presettable limit switch mechanism for controlling the operation of said motor, means for detecting the error of said power screw comprising a precision screw driven by said motor and in threaded engagement with said member, said precision screw being mounted in bearings for axial movement whereby an axial movement of said precision screw proportional to said error is produced, driving connections between said precision screw and said limit switch mechanism including a mechanical differential device for actuating said limit switch mechanism to stop said motor when said member reaches a predetermined limit of travel corresponding to the setting of said limit switch mechanism, and means responsive to said axial movement for introducing a correcting movement through said differential device into said driving connections to compensate for said error.

MARTIN A. EDWARDS.
KENNETH K. BOWMAN.